(12) United States Patent
Hsiang et al.

(10) Patent No.: US 11,785,258 B2
(45) Date of Patent: Oct. 10, 2023

(54) METHODS AND APPARATUS FOR SIGNALING CODING UNIT PARTITIONING OF VIDEO DATA

(71) Applicant: MEDIATEK INC., Hsinchu (TW)

(72) Inventors: Shih-Ta Hsiang, Hsinchu (TW); Zhi-Yi Lin, Hsinchu (TW); Tzu-Der Chuang, Hsinchu (TW); Ching-Yeh Chen, Hsinchu (TW); Chih-Wei Hsu, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 16/980,920

(22) PCT Filed: Mar. 25, 2019

(86) PCT No.: PCT/CN2019/079458
§ 371 (c)(1),
(2) Date: Sep. 15, 2020

(87) PCT Pub. No.: WO2019/184852
PCT Pub. Date: Oct. 3, 2019

(65) Prior Publication Data
US 2020/0413102 A1   Dec. 31, 2020

Related U.S. Application Data

(60) Provisional application No. 62/647,923, filed on Mar. 26, 2018, provisional application No. 62/647,919, filed on Mar. 26, 2018.

(51) Int. Cl.
*H04N 19/70* (2014.01)
*H04N 19/119* (2014.01)
(Continued)

(52) U.S. Cl.
CPC ......... *H04N 19/70* (2014.11); *H04N 19/119* (2014.11); *H04N 19/176* (2014.11); *H04N 19/96* (2014.11)

(58) Field of Classification Search
CPC ..... H04N 19/70; H04N 19/119; H04N 19/176
See application file for complete search history.

(56) References Cited

U.S. PATENT DOCUMENTS

| | | | |
|---|---|---|---|
| 9,525,884 B2 | 12/2016 | Huang et al. | |
| 2014/0119433 A1* | 5/2014 | Park | H04N 19/117 375/240.02 |

(Continued)

FOREIGN PATENT DOCUMENTS

| | | |
|---|---|---|
| CN | 103238318 A | 8/2013 |
| WO | 2015/042751 A1 | 4/2015 |

(Continued)

OTHER PUBLICATIONS

International Search Report and Written Opinion dated Jun. 19, 2019, issued in application No. PCT/CN2019/079458.

(Continued)

*Primary Examiner* — Jonathan R Messmore
(74) *Attorney, Agent, or Firm* — McClure, Qualey & Rodack, LLP

(57) ABSTRACT

A method and apparatus of video coding for a video encoding system or video decoding system are disclosed. According to one method, the current block region is partitioned into one or more leaf blocks using quadtree (QT) partition and/or 1D (one-dimensional) partition by firstly signalling or parsing a first syntax element to indicate whether the current block region is split into multiple smaller blocks. According to a second method, a target syntax model from multiple syntax models is determined. The current block region is partitioned into one or more leaf blocks using QT partition and/or 1D partition and signalling block partition informa- (Continued)

tion according to the target syntax model at an encoder side, or the block partition information is parsed according to the target syntax model and the current block region is partitioned into one or more leaf blocks at a decoder side.

6 Claims, 10 Drawing Sheets

(51) Int. Cl.
    *H04N 19/176*     (2014.01)
    *H04N 19/96*     (2014.01)

(56) References Cited

U.S. PATENT DOCUMENTS

| | | | |
|---|---|---|---|
| 2016/0330479 A1* | 11/2016 | Liu | H04N 19/13 |
| 2016/0337667 A1 | 11/2016 | Nagaoka | |
| 2017/0347095 A1 | 11/2017 | Panusopone et al. | |
| 2017/0347096 A1* | 11/2017 | Hong | H04N 19/70 |
| 2017/0347128 A1 | 11/2017 | Panusopone et al. | |
| 2018/0070110 A1* | 3/2018 | Chuang | H04N 19/119 |
| 2018/0139444 A1* | 5/2018 | Huang | H04N 19/119 |
| 2018/0288381 A1* | 10/2018 | He | H04N 19/85 |
| 2019/0141319 A1 | 5/2019 | Moon et al. | |
| 2020/0177878 A1* | 6/2020 | Choi | H04N 19/159 |
| 2021/0021840 A1* | 1/2021 | Jang | H04N 19/176 |

FOREIGN PATENT DOCUMENTS

| | | |
|---|---|---|
| WO | 2017/188780 A2 | 11/2017 |
| WO | 2018/028615 A1 | 2/2018 |
| WO | 2018/049020 A1 | 3/2018 |

OTHER PUBLICATIONS

Chinese language office action dated Mar. 13, 2020, issued in application No. TW 108110371.
Chinese language office action dated May 9, 2023, issued in application No. CN 201980020493.6.
Li, X., et al.; "Multi-Type-Tree," Joint Video Exploration Team (JVET) of ITU-T SG 16 WP 3 and ISO/IEC JTC 1/SC 29/WG 11; Oct. 2016; pp. 1-3.

* cited by examiner

M/2xM
Symmetric vertical splitting

M/2xM
Symmetric horizontal splitting

M/4xM (L)   M/4xM (R)   MxM/4 (U)   MxM/4 (D)

METHODS AND APPARATUS FOR SIGNALING CODING UNIT PARTITIONING OF VIDEO DATA

CROSS REFERENCE TO RELATED APPLICATIONS

The present invention claims priority to U.S. Provisional Patent Application, Ser. No. 62/647,919 filed on Mar. 26, 2018 and U.S. Provisional Patent Application, Ser. No. 62/647,923 filed on Mar. 26, 2018. The U.S. Provisional patent applications are hereby incorporated by reference in their entireties.

FIELD OF THE INVENTION

The present invention relates to video coding using flexible block partition types. In particular, the present invention discloses syntax signalling methods to improve coding efficiency associated with block partition information.

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set). This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8.

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU as shown in FIG. 2, including 2N×2N, 2N×N, N×2N, N×N, 2N×nU, 2N×nD, nL×2N and nR×2N partition types. Unlike the CU, the PU may only be split once according to HEVC. The partitions shown in the second row correspond to asymmetric partitions, where the two partitioned parts have different sizes.

After obtaining the residual block by the prediction process based on PU splitting type, the prediction residues of a CU can be partitioned into transform units (TU) according to another quadtree structure which is analogous to the coding tree for the CU as shown in FIG. 1. The solid lines indicate CU boundaries and dotted lines indicate TU boundaries. The TU is a basic representative block having residual or transform coefficients for applying the integer transform and quantization. For each TU, one integer transform having the same size to the TU is applied to obtain residual coefficients. These coefficients are transmitted to the decoder after quantization on a TU basis.

The terms coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

Alternatively, a binary tree block partitioning structure is proposed in JCTVC-P1005 (D. Flynn, et al, "HEVC Range Extensions Draft 6", Joint Collaborative Team on Video Coding (JCT-VC) of ITU-T SG 16 WP 3 and ISO/IEC JTC 1/SC 29/WG 11, 16th Meeting: San Jose, US, 9—17 Jan. 2014, Document: JCTVC-P1005). In the proposed binary tree partitioning structure, a block can be recursively split into two smaller blocks using various binary splitting types as shown in FIG. 3. The most efficient and simplest ones are the symmetric horizontal and vertical split as shown in the top two splitting types in FIG. 3. For a given block of size M×N, a flag is signalled to indicate whether the given block is split into two smaller blocks. If yes, another syntax element is signalled to indicate which splitting type is used. If the horizontal splitting is used, the given block is split into two blocks of size M×N/2. If the vertical splitting is used, the given block is split into two blocks of size M/2×N. The binary tree splitting process can be iterated until the size (width or height) for a splitting block reaches a minimum allowed block size (width or height). The minimum allowed block size can be defined in high level syntax such as SPS. Since the binary tree has two splitting types (i.e., horizontal and vertical), the minimum allowed block width and height should be both indicated. Non-horizontal splitting is implicitly implied when splitting would result in a block height smaller than the indicated minimum. Non-vertical splitting is implicitly implied when splitting would result in a block width smaller than the indicated minimum. FIG. 4 illustrates an example of block partitioning 410 and its corresponding binary tree 420. In each splitting node (i.e., non-leaf node) of the binary tree, one flag is used to indicate which splitting type (horizontal or vertical) is used, where 0 may indicate horizontal splitting and 1 may indicate vertical splitting.

The binary tree structure can be used for partitioning an image area into multiple smaller blocks such as partitioning a slice into CTUs, a CTU into CUs, a CU into PUs, or a CU into TUs, and so on. The binary tree can be used for partitioning a CTU into CUs, where the root node of the binary tree is a CTU and the leaf node of the binary tree is CU. The leaf nodes can be further processed by prediction and transform coding. For simplification, there is no further partitioning from CU to PU or from CU to TU, which means CU equal to PU and PU equal to TU. Therefore, in other words, the leaf node of the binary tree is the basic unit for prediction and transforms coding.

Binary tree structure is more flexible than quadtree structure since more partition shapes can be supported, which is also the source of coding efficiency improvement. However, the encoding complexity will also increase in order to select the best partition shape. In order to balance the complexity and coding efficiency, a method to combine the quadtree and binary tree structure, which is also called as quadtree plus binary tree (QTBT) structure, has been disclosed. According to the QTBT structure, a block is firstly partitioned by a quadtree structure and the quadtree splitting can be iterated until the size for a splitting block reaches the minimum allowed quadtree leaf node size. If the leaf quadtree block is not larger than the maximum allowed binary tree root node size, it can be further partitioned by a binary tree structure and the binary tree splitting can be iterated until the size (width or height) for a splitting block reaches the minimum allowed binary tree leaf node size (width or height) or the binary tree depth reaches the maximum allowed binary tree depth. In the QTBT structure, the minimum allowed quadtree leaf node size, the maximum allowed binary tree root node size, the minimum allowed binary tree leaf node width and height, and the maximum allowed binary tree depth can be indicated in the high level syntax such as in SPS. FIG. 5 illustrates an example of block partitioning 510 and its corresponding QTBT 520. The solid lines indicate quadtree splitting and dotted lines indicate binary tree splitting. In each splitting node (i.e., non-leaf node) of the binary tree, one flag indicates which splitting type (horizontal or vertical) is used, 0 may indicate horizontal splitting and 1 may indicate vertical splitting.

The above QTBT structure can be used for partitioning an image area (e.g. a slice, CTU or CU) into multiple smaller blocks such as partitioning a slice into CTUs, a CTU into CUs, a CU into PUs, or a CU into TUs, and so on. For example, the QTBT can be used for partitioning a CTU into CUs, where the root node of the QTBT is a CTU which is partitioned into multiple CUs by a QTBT structure and the CUs are further processed by prediction and transform coding. For simplification, there is no further partitioning from CU to PU or from CU to TU. That means CU equal to PU and PU equal to TU. Therefore, in other words, the leaf node of the QTBT structure is the basic unit for prediction and transform.

An example of QTBT structure is shown as follows. For a CTU with size 128×128, the minimum allowed quadtree leaf node size is set to 16×16, the maximum allowed binary tree root node size is set to 64×64, the minimum allowed binary tree leaf node width and height both is set to 4, and the maximum allowed binary tree depth is set to 4. Firstly, the CTU is partitioned by a quadtree structure and the leaf quadtree unit may have size from 16×16 (i.e., minimum allowed quadtree leaf node size) to 128×128 (equal to CTU size, i.e., no split). If the leaf quadtree unit is 128×128, it cannot be further split by binary tree since the size exceeds the maximum allowed binary tree root node size 64×64. Otherwise, the leaf quadtree unit can be further split by binary tree. The leaf quadtree unit, which is also the root binary tree unit, has binary tree depth as 0. When the binary tree depth reaches 4 (i.e., the maximum allowed binary tree as indicated), no splitting is implicitly implied. When the block of a corresponding binary tree node has width equal to 4, non-horizontal splitting is implicitly implied. When the block of a corresponding binary tree node has height equal to 4, non-vertical splitting is implicitly implied. The leaf nodes of the QTBT are further processed by prediction (Intra picture or Inter picture) and transform coding.

For I-slice, the QTBT tree structure is usually applied with the luma/chroma separate coding. For example, the QTBT tree structure is applied separately to luma and chroma components for I-slice, and applied simultaneously to both luma and chroma (except when certain minimum sizes being reached for chroma) for P- and B-slices. In other words, in an I-slice, the luma CTB has its QTBT-structured block partitioning and the two chroma CTBs have another QTBT-structured block partitioning. In another example, the two chroma CTBs can also have their own QTBT-structured block partitions.

For block-based coding, there is always a need to partition an image into blocks (e.g. CUs, PUs and TUs) for the coding purpose. As known in the field, the image may be divided into smaller images areas, such as slices, tiles, CTU rows or CTUs before applying the block partition. The process to partition an image into blocks for the coding purpose is referred as partitioning the image using a coding unit (CU) structure. The particular partition method to generate CUs, PUs and TUs as adopted by HEVC is an example of the coding unit (CU) structure. The QTBT tree structure is another example of the coding unit (CU) structure.

To further support more partition shapes to achieve more flexible partitioning, triple tree partitioning method is designed to capture objects which locate in the block centre while quad-tree and binary tree partitioning methods always split along the block centre. FIG. 6 illustrates vertical triple tree partitioning (610) and horizontal triple tree partitioning (620). The triple tree partitioning method may provide capability to faster localize small object along block boundaries, by allowing one-quarter partitioning vertically or horizontally.

Multi-Type-Tree (MTT) block partitioning extends the concept of the two-level tree structure in QTBT by allowing both the binary tree and triple tree partitioning methods in the second level of MTT. In other words, a CU can be further split into smaller size CUs using one of the five split types illustrated in FIG. 7 (i.e., QT 710, Vertical BT 720, Horizontal BT 730, Vertical TT (triple tree) 740, and Horizontal TT 750). The new split types 740 and 750 can be employed to divide a block into three smaller size blocks.

After constructing the MTT block partition, MTT leaf nodes are CUs, which are used for prediction and transform without any further partitioning. In MTT, the proposed tree structure is coded separately for luma and chroma in I slice, and applied simultaneously to both luma and chroma (except when certain minimum sizes are reached for chroma) in P and B slice. That is to say that, in I slice, the luma CTB has its QTBT-structured block partitioning, and the two chroma CTBs has another QTBT-structured block partitioning.

While the MTT is able to improve performance by adaptively partitioning blocks for prediction and transform, it is desirable to further improve the performance whenever possible in order to achieve an overall efficiency target.

BRIEF SUMMARY OF THE INVENTION

A method and apparatus of video coding for a video encoding system or video decoding system are disclosed. According to one method, the current block region is partitioned into one or more leaf blocks using quadtree (QT) partition and/or 1D (one-dimensional) partition by firstly signalling or parsing a first syntax element to indicate whether the current block region is split into multiple smaller blocks. The current block region is encoded or decoded by applying encoding or decoding process to said one or more leaf blocks. The current block region may correspond to one block with a predefined size, one current coded CU (coding unit), or one CTU (coding tree unit).

When the current block region is not split as indicated by the first syntax element, no further syntax element will be signalled. When the current block region is split as indicated by the first syntax element, one or more additional syntax elements are signalled. When the current block region is split as indicated by the first syntax element, a second syntax element is signalled to indicate whether the current block region is split using the QT partition or the 1D partition. When the second syntax element indicates the current block region being partitioned by the 1D partition, one or more additional syntax elements are signalled to indicate whether the 1D partition is horizontal BT (binary tree) partition, vertical BT partition, horizontal TT (triple tree) partition, or vertical TT partition.

In one embodiment, the 1D partition consists of horizontal BT (binary tree) partition, vertical BT partition, horizontal TT (triple tree) partition, and vertical TT partition.

According to a second method, a target syntax model from multiple syntax models is determined. The current block region is partitioned into one or more leaf blocks using quadtree (QT) partition and/or 1D (one-dimensional) partition and signalling block partition information according to the target syntax model at an encoder side, or the block partition information is parsed according to the target syntax model and the current block region is partitioned into one or more leaf blocks at a decoder side. The current block region is encoded or decoded by applying encoding or decoding process to said one or more leaf blocks. The current block region may correspond to one block with a predefined size, one current coded CU (coding unit), or one CTU (coding tree unit).

A syntax element may be used to indicate the target syntax model selected from the multiple syntax models. The target syntax model may be determined based on the size of leaf CUs, the maximum QT or CT (coding tree) depth, a number of leaf CUs being partitioned by BT (binary tree) partition or QT partition, or a combination of thereof.

In one embodiment, the QT partition is used before the 1D partition, and the QT partition is forbidden after the 1D partition is used.

In one embodiment, no further syntax element is signalled when the current block region is not split as indicated by the first syntax element, and one or more additional syntax elements are signalled when the current block region is split as indicated by the first syntax element.

BRIEF DESCRIPTION OF THE DRAWINGS

FIG. 18A shows an example of block partition FIG. 18B illustrates the syntax coding based on the conventional syntax coding in Table 1 and FIG. 18C illustrates the syntax coding based on the proposed codeword for signalling the splitting information in Table 2.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the video coding based on the Multi-Type-Tree (MTT) Block Partition structure, the coding efficiency has been shown noticeable improvement since more flexible partitions become available. It is desirable to develop methods to reduce computational complexity when MTT is used. Accordingly, various methods to improve the coding efficiency, in particular signalling for the block partition information, are disclosed.

The signalling overhead of syntax for CU partition becomes larger as more partition methods are introduced to be combined with quadtree in the next generation video coding. In the present invention, a multi-model syntax design for CU structure syntax is disclosed. With the proposed multi-model syntax design, different CU structures can be coded by using different syntax models, and hence the signalling overhead for CU partitioning can be reduced.

Different Syntax Models to Adapt to Different CU Structures

According to embodiments of the present invention, different syntax models for coding the CU structure of a block region are disclosed. The block region can be a block with the size equal to a predefined size, a current coded CU (not necessarily a leaf CU), or a CTU. A syntax will be used to indicate which syntax model is used for the current block region. Different kinds of syntax models may be required to suit for different kinds of CU structures. More than one syntax model can be used in the present method. The CU structure can be any characteristics of the partitioning result. For example, the type of CU structure can be decided based on size of leaf CUs, the maximum QT or CT depth, the number of leaf CUs that are partitioned by BT splitting or QT splitting, or the combinations of the above. The CT depth refers to the coding tree depth from a leaf QT.

Figure 1:
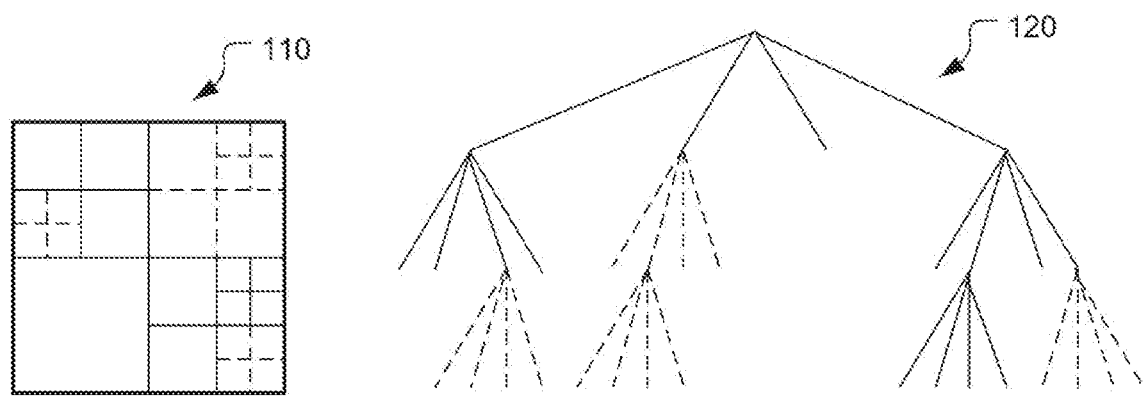
FIG. 1 illustrates an example of block partition using quadtree structure to partition a coding tree unit (CTU) into coding units (CUs).
Figure 2:
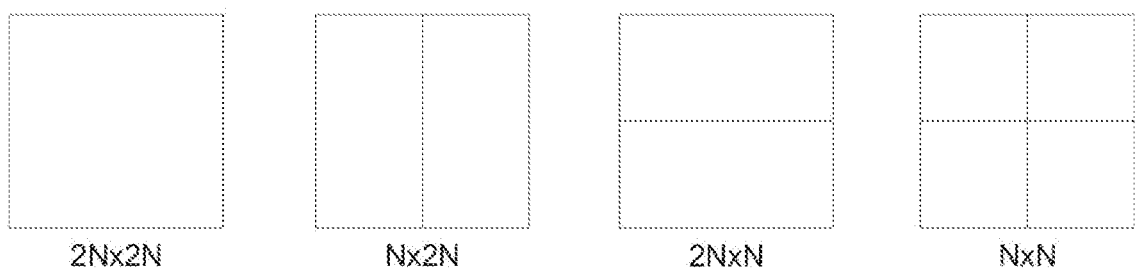
FIG. 2 illustrates asymmetric motion partition (AMP) according to High Efficiency Video Coding (HEVC), where the AMP defines eight shapes for splitting a CU into PU.
Figure 2:
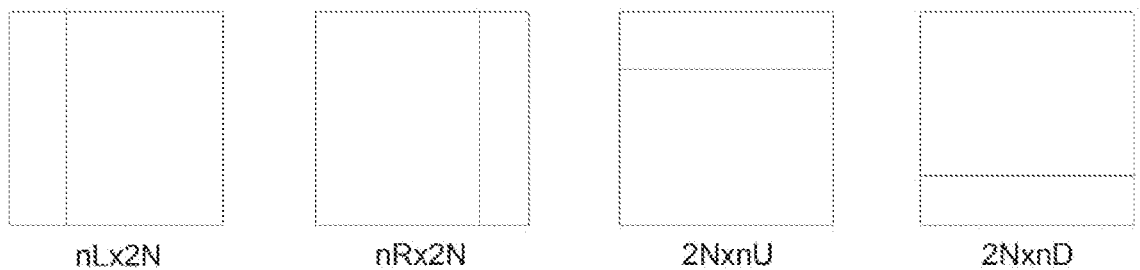
Figure 3:
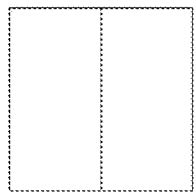
FIG. 3 illustrates an example of various binary splitting types used by a binary tree partitioning structure, where a block can be recursively split into two smaller blocks using the splitting types.
Figure 3:
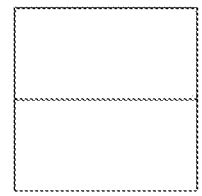
Figure 3:
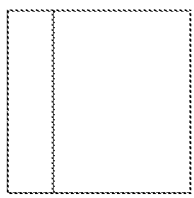
Figure 3:
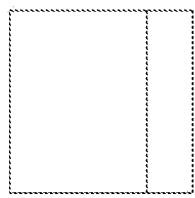
Figure 3:
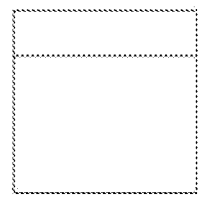
Figure 3:
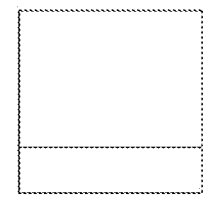
Figure 4:
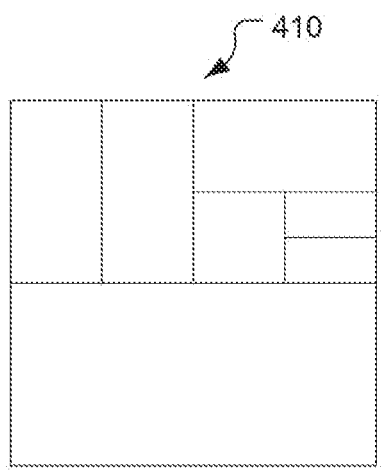
FIG. 4 illustrates an example of block partitioning and its corresponding binary tree, where in each splitting node (i.e., non-leaf node) of the binary tree, one syntax is used to indicate which splitting type (horizontal or vertical) is used, where 0 may indicate horizontal splitting and 1 may indicate vertical splitting.
Figure 4:
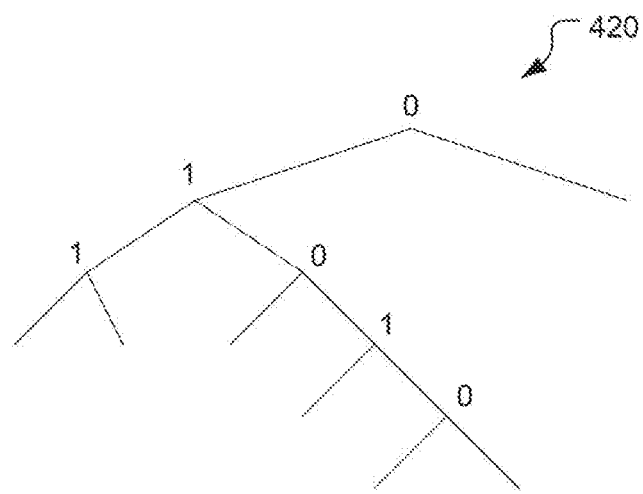
Figure 5:
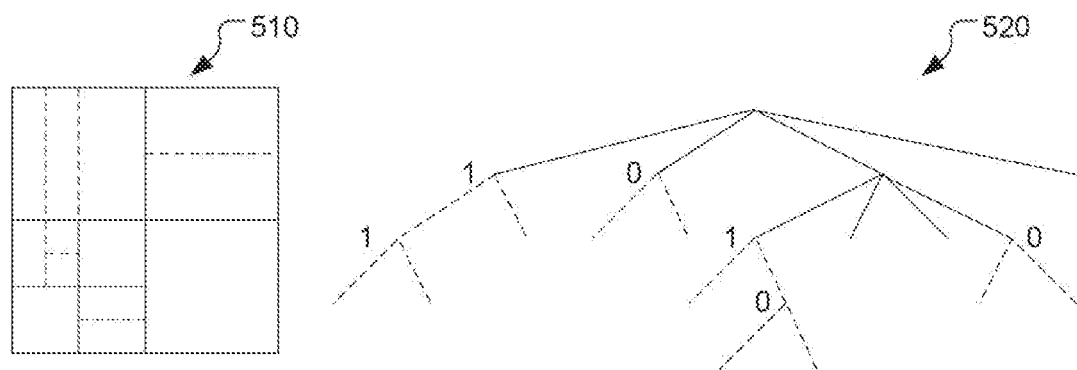
FIG. 5 illustrates an example of block partitioning and its corresponding quad-tree plus binary tree structure (QTBT), where the solid lines indicate quadtree splitting and dotted lines indicate binary tree splitting.
Figure 6:
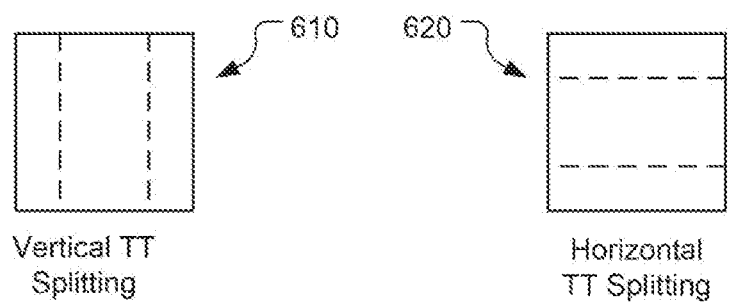
FIG. 6 illustrates vertical triple tree partitioning and horizontal triple tree partitioning.
Figure 7:
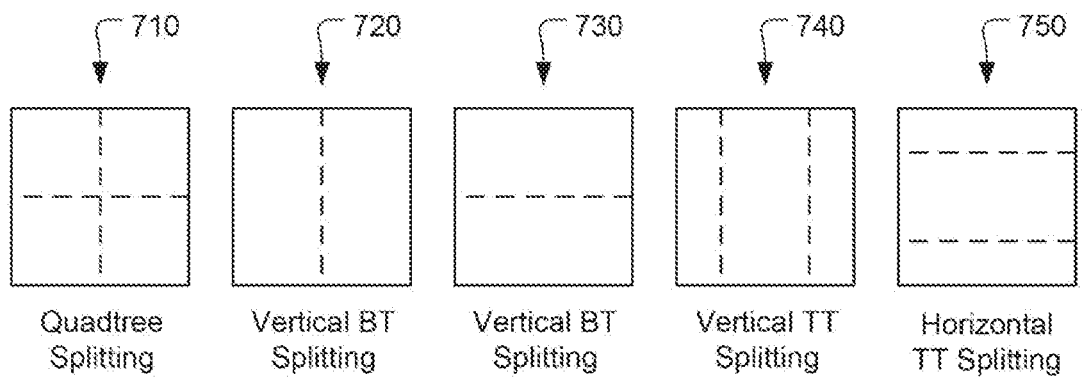
FIG. 7 illustrates various types of block partition used for Multi-Type-Tree (MTT) block partitioning including quadtree partitioning, vertical binary tree partitioning and horizontal binary tree partitioning, vertical triple tree partitioning and horizontal triple tree partitioning.
Figure 8:
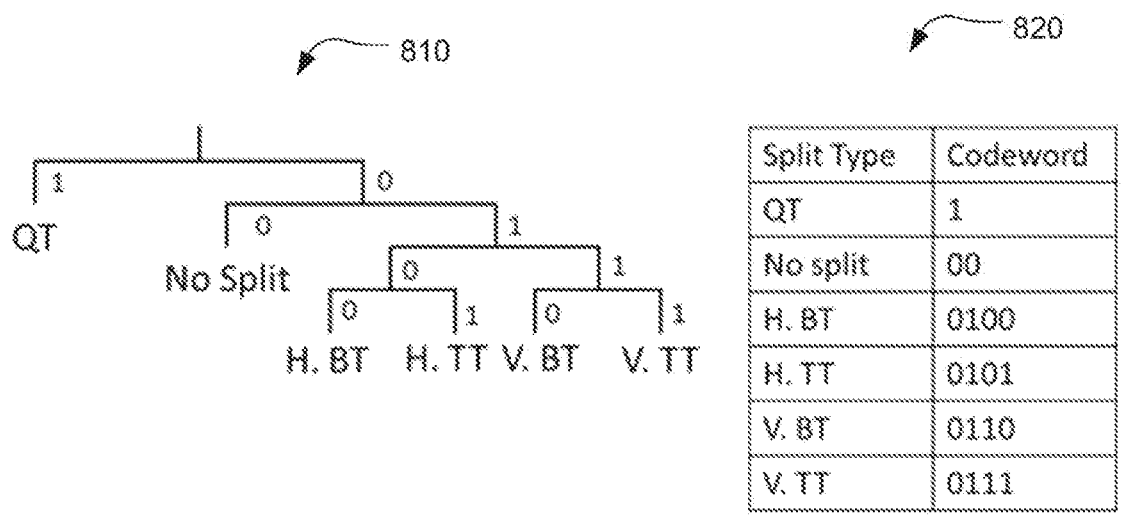
FIG. 8 illustrates an example of block partition syntax model and corresponding codeword table for a first syntax model.
Figure 9:
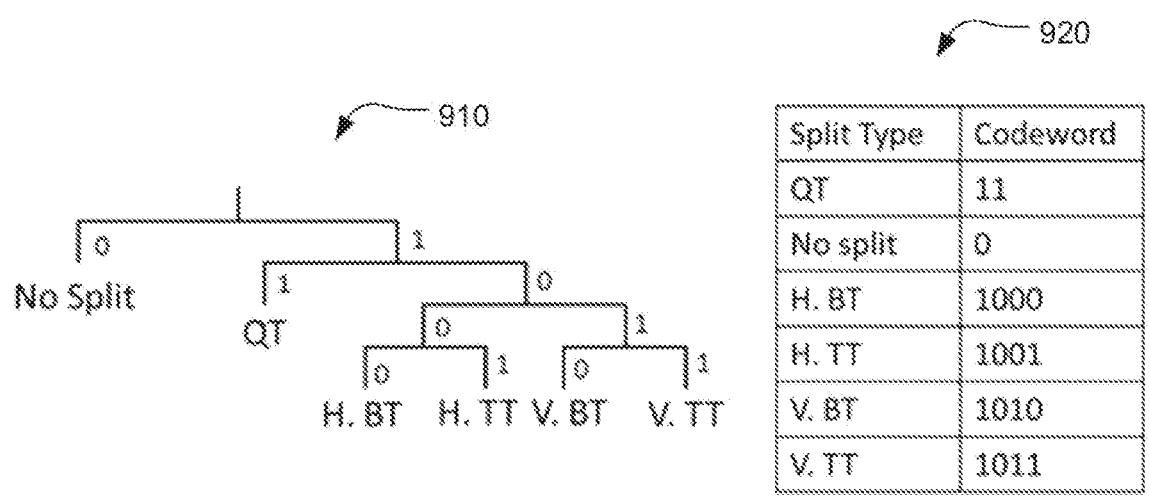
FIG. 9 illustrates an example of block partition syntax model and corresponding codeword table for a second syntax model.

In one embodiment, two syntax models are used for coding the CU structures. The first syntax model is shown in FIG. 8 and the second model is shown in FIG. 9. In FIG. 8, an example of block partition syntax model 810 and corresponding codeword table 820 are shown. In FIG. 9, another example of block partition syntax model 910 and corresponding codeword table 920 are shown. In the above examples, the QT split is done before the BT or TT split. After the BT or TT split, QT split is forbidden.

Figure 10:
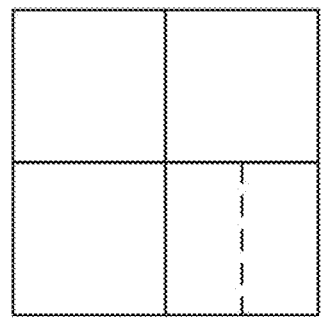
FIG. 10 illustrates an example of block partition, where solid lines indicate QT partition and the dash line indicates BT partition.
Figure 11:
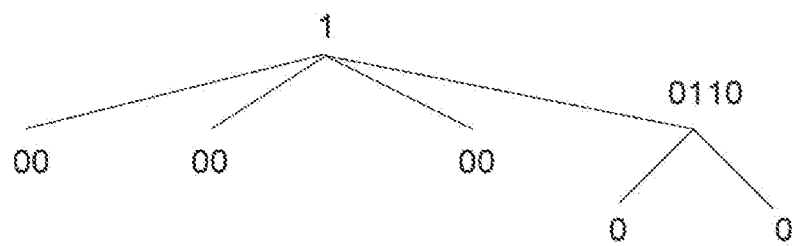
FIG. 11 illustrates an example of resulting structure and syntaxes corresponding to syntax signalling for the block in FIG. 10 according to the block partition syntax model in FIG. 8.
Figure 12:
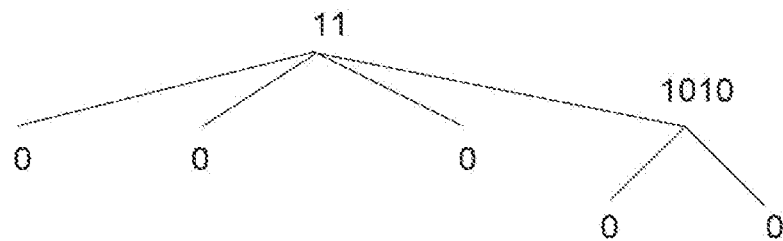
FIG. 12 illustrates an example of resulting structure and syntaxes corresponding to syntax signalling for the block in FIG. 10 according to the block partition syntax model in FIG. 9.

Different CU structures may be required to suit for different syntax models. For example, most of the leaf CUs in a block region are resulted from the QT split, as shown in FIG. 10, where solid lines indicate QT partition and the dash line indicates BT partition. As shown in FIG. 10, the QT split is used to partition block region into 4 sub-CUs. Among the 4 sub-CUs, three sub-CUs are leaf CUs without further splitting. Only one sub-CU is further split using vertical BT into two leaf-CUs. The resulting structure is as shown in FIG. 11 with the codewords for signalling each partition decision labelled. It requires 13 bins to encode this structure by using the syntax Model 1 in FIG. 8. Note that, for the leaf CUs from BT or TT split, only one bin (bin value=0) is needed to indicate that there is no further split. If the block region is coded using the syntax Model 2 in FIG. 9, the total coded bins will become 11 as shown in FIG. 12. The bin reduction mainly comes from the shorter codeword corresponding to No-Split of the leaf CUs from QT split. In other words, in the case that more CUs are QT leaf CUs, the syntax Model 2 is more efficient.

Figure 13:
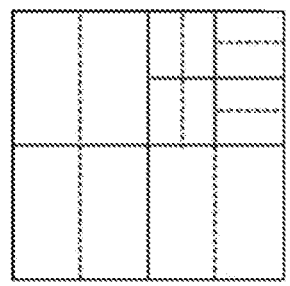
FIG. 13 illustrates another block partition example, where solid lines indicate QT partition and the dash line indicates BT partition.
Figure 14:
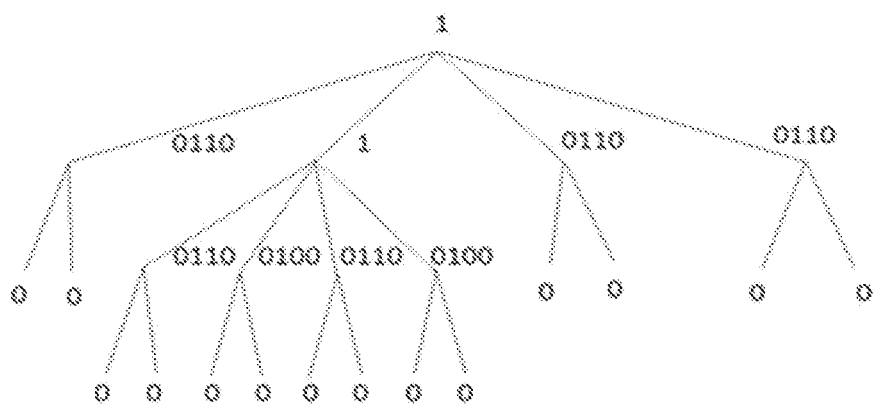
FIG. 14 illustrates an example of resulting structure and syntaxes corresponding to syntax signalling for the block in FIG. 13 according to the block partition syntax model in FIG. 8.
Figure 15:
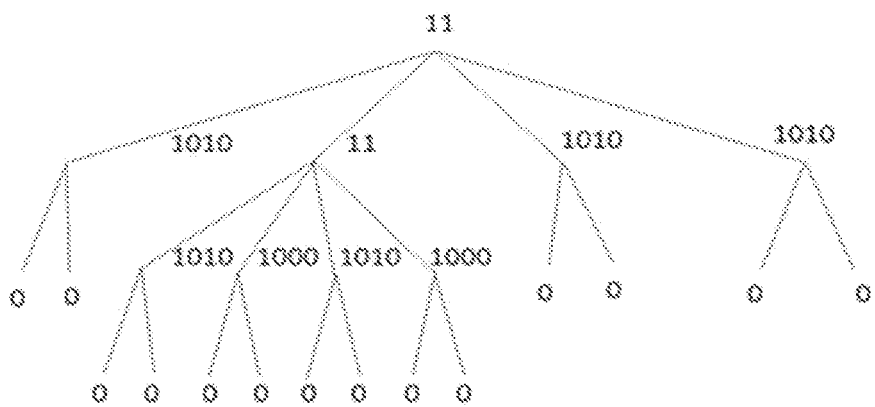
FIG. 15 illustrates an example of resulting structure and syntaxes corresponding to syntax signalling for the block in FIG. 13 according to the block partition syntax model in FIG. 9.

FIG. 13 illustrates another block partition example, where solid lines indicate QT partition and the dash line indicates BT partition. In this example, the block region has larger QT depths and most of the leaf CUs are from BT or TT. For this block partition example, syntax Model 1 is better for coding the CU structure than Model 2. For example, it requires 44 bins as shown in FIG. 14 by using the syntax Model 1, while it requires 46 bins as shown in FIG. 15 by using the syntax Model 2. For this type of CU structure, all of the leaf CUs will be coded with 0 in both syntax models, and hence the length of the codeword for QT split flag will become more crucial.

Therefore, in one embodiment of the proposed method, one syntax is used to indicate which syntax model is used for the current block region. For example, if most of the leaf CUs in current block are from QT split (e.g. the block partition in FIG. 10), the syntax Model 2 will be selected. On the other hand, for the CU structure as shown in FIG. 13, the syntax Model 1 will be selected.

The syntax model can be a codeword table (e.g., the syntax Model 1 and syntax Model 2 in FIG. 8 and FIG. 9) or a CU splitting rule. For example, the rule can be the max/min QT depth, max/min BT/TT depth, max/min CU size, or the combination of above. If a rule is used, the CU splitting must follow the rule. For example, if a rule corresponds to that the CU size must be larger than or equal to 2048, the split flag is inferred as 0 when the CU size after splitting is smaller than 2048.

Syntax Signalling

One or more syntaxes for selecting the syntax model for each block region can be explicitly signalled or inferred. The block region can be a block with size equal to a pre-defined size (e.g. M×N block size, M and N=integer numbers), a current coded CU (not necessarily a leaf CU), or a CTU. If the syntax is explicitly signalled, it will be signalled before the split flags in the current block region. In one embodiment, this syntax can directly indicate the syntax model for the current block region. For example, a flag or an index can be used for selecting one of the syntax models. In one example, a flag is signalled for each CTU to select one of the CU splitting codeword tables associated with the two syntax models (e.g. the syntax Model 1 and syntax Model 2 in FIG. 8 and FIG. 9 respectively). The syntax may be entropy coded using context-coded bins conditioned on the contextual information. The model selection may be dependent on the current block size, the current QT/CT depth and/or the related syntax values in the neighbouring blocks.

In another embodiment, one or more suitable syntax models can be predicted by using the information of the current block region and/or the information of the one or more neighbouring blocks. One or more syntax is used to indicate whether the predicted syntax model is correctly predicted or select one syntax model from one of the predicted syntax models. The information includes the current CU structure, the neighbouring CUs' structure (e.g. the above CUs' structure or left CUs' structure, both the above and left CUs' structure), or the neighbouring block regions. In one example, a syntax model is predicted from the neighbouring information. A flag can be set to 1 if the predicted syntax model is selected.

In another embodiment, one signalled syntax will indicate the syntax model to be used in the current block among two syntax model candidates. These two candidates can be also derived by a syntax model derivation method.

To select the best syntax model, we can test different syntax models after finishing the compressing process, or test the syntax models during compressing process. When testing the syntax during the compressing process, the partitioning process can be early terminated according to the current selected syntax model. For example, if the current selected syntax model is a rule and indicates that the maximum QT depth is 1, then QT split in the current block will only be applied once. In other words, no further QT split will be tested when QT depth is equal to 1.

If the syntax is inferred, the syntax model for the current block region can be inferred according to the current block region and/or neighbouring information (e.g. the neighbouring CUs' syntax models, such as above CUs' syntax models, left CUs' syntax model, or both above and left CUs' models). Different syntax model derivation methods can be applied. For example, the inferred syntax model can be the one that is used most in the neighbouring CUs of the current block. For example, for each CU, the codeword table of syntax Model 1 and syntax Model 2 in FIG. 8 and FIG. 9 is adaptively selected according to the neighbouring information. In another example, for each CU, the codeword table of syntax Model 1 and syntax Model 2 in FIG. 8 and FIG. 9 is adaptively selected according to the current CU depth or size and/or the neighbouring information.

The foregoing proposed method can be implemented in encoders and/or decoders. For example, the proposed method can be implemented in CU structure encoding module of an encoder, and/or in CU structure decoding module of a decoder.

In the QTBT structure and the MTT structure, the coding tree unit (CTU) may first be partitioned into four smaller CUs using a quadtree (QT) split structure. A '1' is signalled to indicate that the current CU is further partitioned by quadtree split. A "0" is signalled to indicate that the current CU is a quadtree leaf node and is not further partitioned by quadtree split. A quadtree leaf node may be further divided using one of the 1-dimensional (1-D) split types such as binary-tree (BT) split types and triple-tree (TT) split types that further partitions a CU into multiple CUs, and each has reduced size in one spatial dimension while keeping the same size in the other spatial dimension. When the size of the current quadtree leaf node is no greater than the specified maximum block size for 1-D split, a flag is further signalled to indicate whether to further partition the current quadtree leaf node by a 1-D split type. A "0" is used to indicate that the current node is a 1-D tree leaf node and is not further split. A "1" is used to indicate the current node is further partitioned and the selected split type is further signalled.

Figure 16:
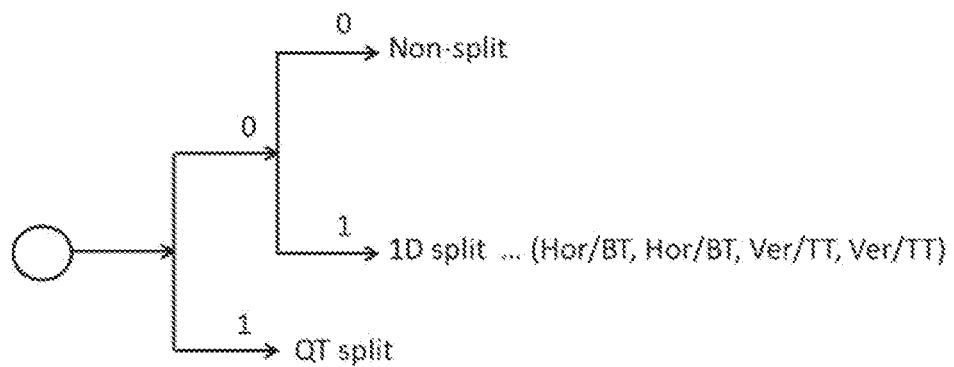
FIG. 16 illustrates the signalling method currently employed by the QTBT structure in JEM (Joint Exploration Test Model 7 (JEM7)).

FIG. 16 illustrates the signalling method currently employed by the QTBT structure in JEM (J. Chen, et al, "Algorithm Description of Joint Exploration Test Model 7 (JEM7)," Joint Video Exploration Team (JVET) of ITU-T VCEG (Q6/16) and ISO/IEC MPEG (JTC 1/SC 29/WG 11), Doc. JVET-G1001, 7th Meeting, Torino, Italy, July 2017) and the MTT structure (X. Li, et al "Multi-Type-Tree," Joint Video Exploration Team (JVET) of ITU-T VCEG (Q6/16) and ISO/IEC MPEG (JTC 1/SC 29/WG 11), Doc. JVET-D0117, 4th Meeting: Chengdu, CN, 15-21 Oct. 2016). According to the existing practice, the effective codeword for signalling different splitting decisions is provided in Table 1. The 'b0" bit indicates whether to partition the current CU by a quadtree split. The 'b0" is not signalled when the current CU is forced to be quadtree split or non-split. The "b1" bit indicates whether to further partition the current CU by a 1-D split type and the bit is not signalled when no 1-D split type is valid for partitioning the current node. The "b2" bit indicates the selected split direction for 1-D partitioning. The "b3" bit indicates the selected 1-D split type when both binary-tree split and triple-tree split are valid for further partitioning the current CU.

TABLE 1

|  | b0 | b1 | b2 | b3 |
|---|---|---|---|---|
| Non-split | 0 | 0 |  |  |
| Quadtree split | 1 |  |  |  |
| 1-D split | 0 | 1 | x | x |

Figure 17:
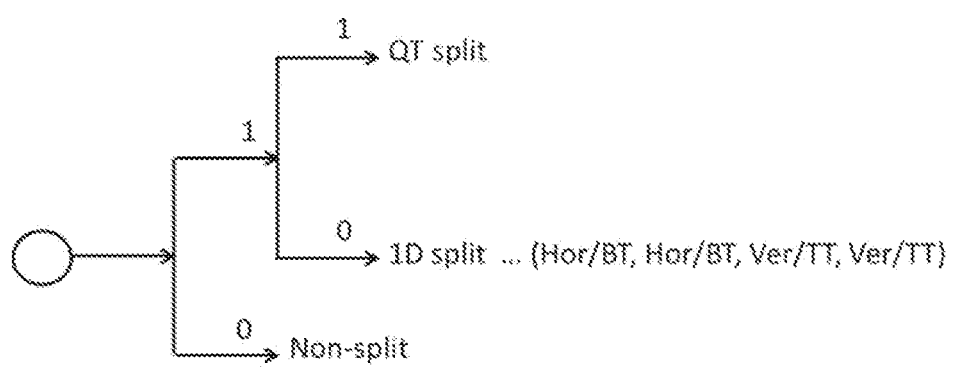
FIG. 17 illustrates the signalling method according to an embodiment of the proposed method, where a flag is first coded to indicate whether to further split the current CU.

In the present disclosure, a new method is proposed for signalling the CU partitioning information. In the proposed method as illustrated in FIG. 17, a flag is first coded to indicate whether to further split the current CU. A "0" is signalled to indicate that the current CU is a leaf node and is not further partitioned. A "1" is signalled to indicate that the current CU is further partitioned into smaller size CUs. A flag is further signalled to indicate the current node is further partitioned by quadtree split or a 1-D split type. When it is signalled that a 1-D split type is employed, the selected 1-D split type is further signalled. In this way, the effective codeword for signalling the splitting information is provided in Table 2. The 'b0" bit indicates whether to further split the current CU and the bit is not signalled when the current CU is forced to be split or non-split. The "b1" bit indicates whether to select quadtree split or a 1-D split type and the bit is not signalled when quadtree split and 1-D split are not both valid for partitioning the current node. The "b2" bit indicates the selected split direction for 1-D partitioning. The "b3" bit indicates the selected 1-D split type when both binary-tree split and triple-tree split are valid for further partitioning the current CU.

TABLE 2

|  | b0 | b1 | b2 | b3 |
|---|---|---|---|---|
| Non-split | 0 |  |  |  |
| Quadtree split | 1 | 1 |  |  |
| 1-D split | 1 | 0 | x | x |

Figure 18A:
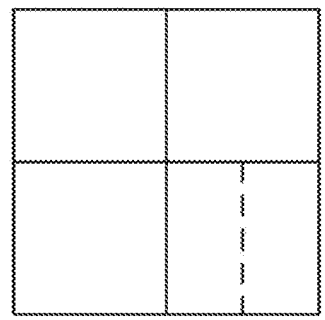
FIG. 18A-FIG. 18C provide an example of comparing the proposed method with the conventional method for signalling the partitioning information, where
Figure 18B:
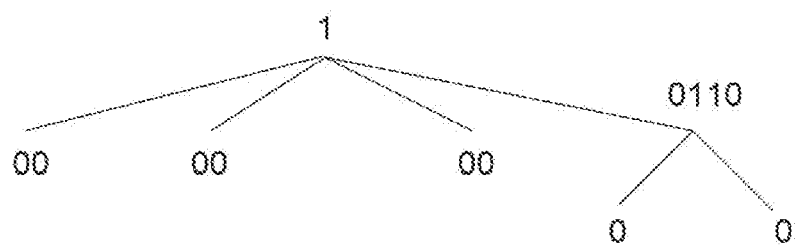
Figure 18C:
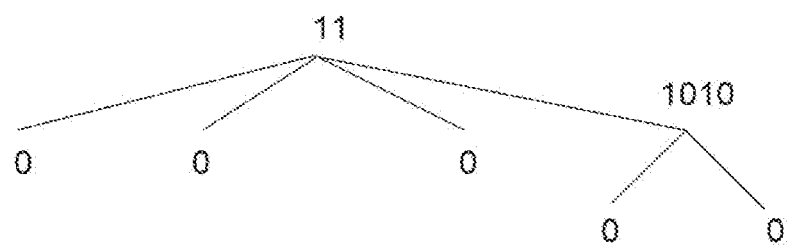

FIG. 18A to FIG. 18C provide an example of comparing the proposed method with the conventional method for signalling the partitioning information corresponding to some specified CU partitions. The block partition example shown in FIG. 18A is the same as the example in FIG. 10. The syntax coding based on the conventional syntax coding shown in FIG. 18B is the same as that in FIG. 11. The syntax coding based on the codeword for signalling the splitting information of Table 2 is shown in FIG. 18C. The syntax coding result in FIG. 18C is the same as the syntax coding result in FIG. 12. Based on the syntax coding results in FIG. 18B and FIG. 18C, fewer bins are employed by the proposed method due to a shorter code word length being assigned for signalling "non-split".

The foregoing proposed method can be implemented in encoders and decoders. For example, the proposed method can be implemented in an entropy encoding module of an encoder, and an entropy decoding module of a decoder.

Figure 19:
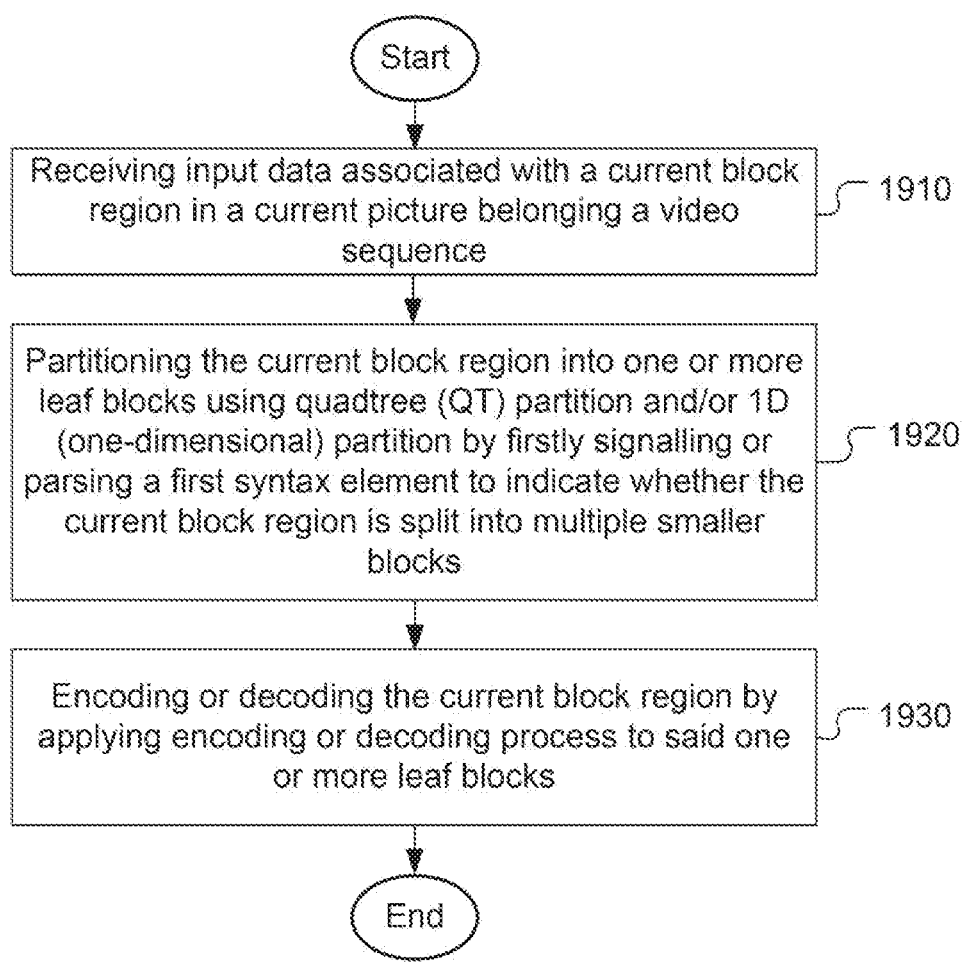
FIG. 19 illustrates a flowchart of an exemplary coding system with syntax signalling according to an embodiment of the present invention.

FIG. 19 illustrates a flowchart of an exemplary coding system with syntax signalling according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based in hardware such as one or more electronic devices or processors arranged to perform the steps in the flowchart. According to this method, input data associated with a current block region in a current picture belonging a video sequence are received in step 1910. In step 1920, the current block region is partitioned into one or more leaf blocks using quadtree (QT) partition and/or 1D (one-dimensional) partition by firstly signalling or parsing a first syntax element to indicate whether the current block region is split into multiple smaller blocks. The current block region is encoded or decoded by applying encoding or decoding process to said one or more leaf blocks in step 1930.

Figure 20:
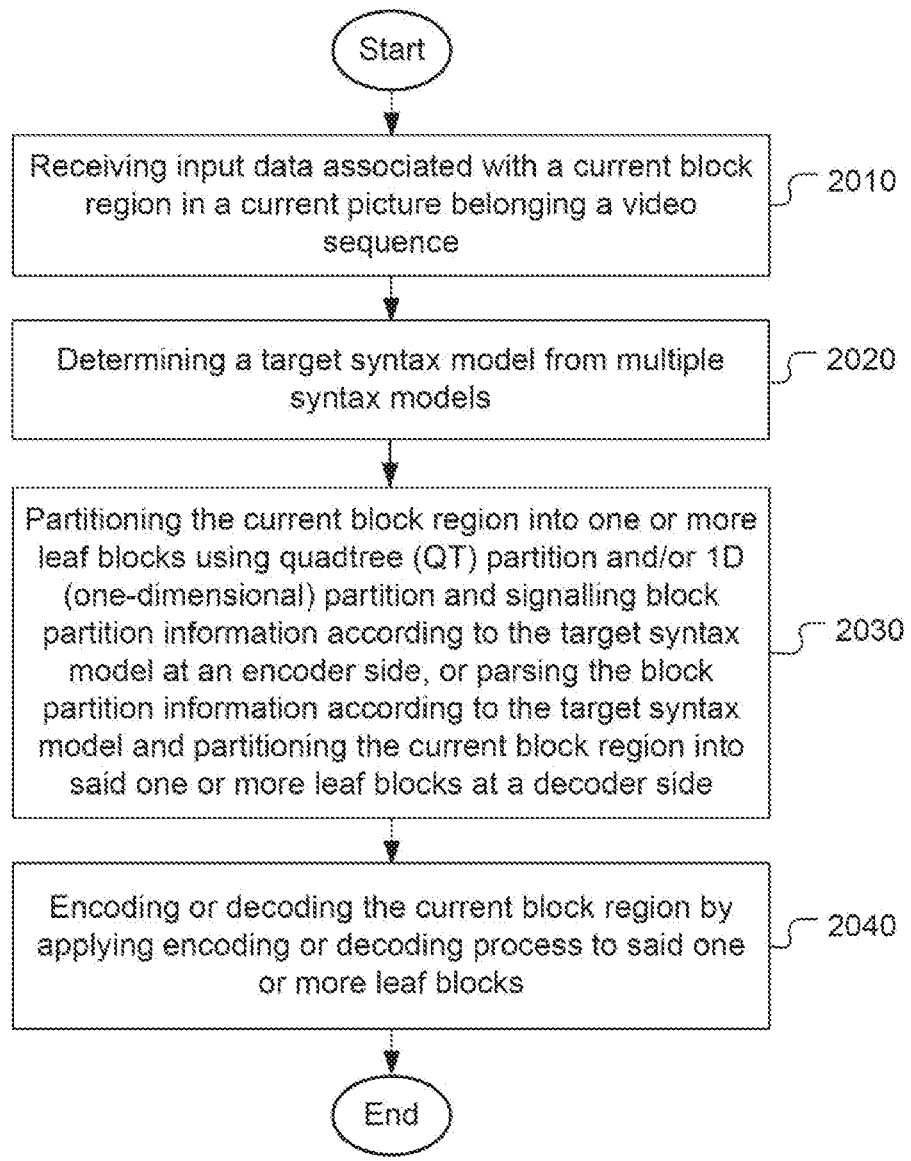
FIG. 20 illustrates a flowchart of another exemplary coding system with syntax signalling according to an embodiment of the present invention.

FIG. 20 illustrates a flowchart of another exemplary coding system with syntax signalling according to an embodiment of the present invention. According to this method, input data associated with a current block region in a current picture belonging a video sequence are received in step 2010. A target syntax model from multiple syntax models is determined in step 2020. In step 2030, the current block region is partitioned into one or more leaf blocks using quadtree (QT) partition and/or 1D (one-dimensional) partition by signalling or parsing block partition information according to the target syntax model. The current block region is encoded or decoded by applying encoding or decoding process to said one or more leaf blocks in step 2040.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding for a video encoder or decoder, the method comprising:
   receiving input data associated with a current block region in a current picture belonging to a video sequence;
   partitioning the current block region into one or more coding units by firstly signalling or parsing a first syntax flag to indicate whether the current block region is split into multiple smaller blocks or whether the current block region is not further split and corresponds to a coding unit, and based on the first syntax flag indicating that the current block region is split into multiple smaller blocks, signalling or parsing a second syntax flag to indicate whether the current block region is split using quadtree (QT) partition or one-dimensional (1D) partition by indicating with a first value for the second syntax flag that the current block is split using QT partition and with a second value for the second syntax flag that the current block is split using 1D partition;
   when the second syntax flag indicates that the current block region is split using 1D partition, signalling or parsing one or more syntax flags to indicate a split type under the 1D partition; and
   encoding or decoding the current block region by applying encoding or decoding process to said one or more coding units.

2. The method of claim 1, wherein the current block region corresponds to one block with a predefined size, one current coded CU (coding unit), or one CTU (coding tree unit).

3. The method of claim 1, wherein no further syntax flag is signalled when the current block region is not split as indicated by the first syntax flag.

4. The method of claim 1, wherein the signalled or parsed split type is a horizontal BT (binary tree) split type, a vertical BT split type, a horizontal TT (triple tree) split type, or a vertical TT split type.

5. The method of claim 1, wherein the 1D partition comprises BT partition and TT partition.

6. An apparatus of for video coding, the apparatus comprising one or more electronic circuitries or processors arranged to:
   receive input data associated with a current block region in a current picture belonging to a video sequence;
   partition the current block region into one or more coding units by firstly signalling or parsing a first syntax flag to indicate whether the current block region is split into multiple smaller blocks or whether the current block region is not further split and corresponds to a coding unit, and based on the first syntax flag indicating that the current block region is split into multiple smaller blocks, signalling or parsing a second syntax flag to indicate whether the current block region is split using quadtree (QT) partition or one-dimensional (1D) partition by indicating with a first value for the second syntax flag that the current block is split using QT partition and with a second value for the second syntax flag that the current block is split using 1D partition;

when the second syntax flag indicates that the current block region is split using 1D partition, signal or parse one or more syntax flags to indicate a split type under the 1D partition; and encode or decode the current block region by applying encoding or decoding process to said one or more coding units.

* * * * *